US012724365B2

(12) United States Patent
Yoshida et al.

(10) Patent No.: US 12,724,365 B2
(45) Date of Patent: Sep. 1, 2026

(54) FIXING APPARATUS

(71) Applicant: CANON KABUSHIKI KAISHA, Tokyo (JP)

(72) Inventors: Keisuke Yoshida, Chiba (JP); Youichi Chikugo, Chiba (JP); Kenichi Tanaka, Ibaraki (JP); Hidekazu Tatezawa, Saitama (JP); Rikiya Takemasa, Chiba (JP); Takeshi Kozuma, Ibaraki (JP); Mikihiko Watanabe, Ibaraki (JP); Taku Ashida, Shizuoka (JP); Shutaro Saito, Tokyo (JP); Yuya Yamada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/887,272

(22) Filed: Sep. 17, 2024

(65) Prior Publication Data

US 2025/0013177 A1 Jan. 9, 2025

Related U.S. Application Data

(63) Continuation of application No. 18/170,787, filed on Feb. 17, 2023, now Pat. No. 12,117,751.

(30) Foreign Application Priority Data

Feb. 28, 2022 (JP) ................................ 2022-028927

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC .......... G03G 15/2017; G03G 15/2025; G03G 15/2028; G03G 15/2053; G03G 2215/2003
See application file for complete search history.

(56) References Cited

U.S. PATENT DOCUMENTS 10,073,391 B2 9/2018 Onaka et al.
11,921,449 B2 * 3/2024 Tanaka ............... G03G 15/2053
(Continued)

FOREIGN PATENT DOCUMENTS

JP 2002299007 A 10/2002
JP 2006047769 A * 2/2006
(Continued)

OTHER PUBLICATIONS

JP 2006047769 English machine translation, Ohara et al., Feb. 16, 2006 (Year: 2006).*
(Continued)

*Primary Examiner* — Thomas S Giampaolo, II
(74) *Attorney, Agent, or Firm* — ROSSI, KIMMS & McDOWELL LLP

(57) ABSTRACT

A fixing apparatus includes a belt, a rotary member, a pad member, and a slide member. A distance in the conveyance direction between a first position and a second position is 3.0 mm or less. The first position is a downstream edge of a tip of a projection positioned most downstream in a direction of rotation of the belt. The second position is an upstream edge, in the direction of rotation of the belt, of the guide portion that contacts with the inner circumference surface of the belt. A distance in the pressing direction between a third position and a fourth position is 0.4 mm or more and 2.0 mm or less. The third position is the tip of the projection
(Continued)

positioned most downstream in the direction of rotation of the belt. The fourth position is the same position as the second position.

8 Claims, 6 Drawing Sheets

(56) References Cited

U.S. PATENT DOCUMENTS

| | | | | |
|---|---|---|---|---|
| 11,960,224 | B2* | 4/2024 | Shinagawa | G03G 15/206 |
| 11,982,961 | B2* | 5/2024 | Kawai | G03G 15/2025 |
| 12,117,751 | B2* | 10/2024 | Yoshida | G03G 15/2064 |
| 2004/0184848 | A1 | 9/2004 | Oonishi | |
| 2014/0341621 | A1 | 11/2014 | Omori et al. | |
| 2017/0176905 | A1 | 6/2017 | Suzuki et al. | |
| 2018/0011435 | A1 | 1/2018 | Tsubotani et al. | |
| 2018/0024479 | A1 | 1/2018 | Yamada et al. | |
| 2020/0285179 | A1* | 9/2020 | Seki | G03G 15/2053 |

FOREIGN PATENT DOCUMENTS

| | | | |
|---|---|---|---|
| JP | 2017116650 | A | 6/2017 |
| JP | 2017181948 | A | 10/2017 |
| JP | 2018013621 | A | 1/2018 |
| JP | 2021110893 | A | 8/2021 |

OTHER PUBLICATIONS

Notice of Allowance issued in U.S. Appl. No. 18/170,787 mailed Jun. 20, 2024.

* cited by examiner

FIXING APPARATUS

BACKGROUND OF THE INVENTION

Field of the Invention

The present invention relates to a fixing apparatus preferably used in an image forming apparatus that utilizes an electrophotographic technique, such as a printer, a copying machine, a facsimile, or a multifunction machine.

Description of the Related Art

Image forming apparatuses are equipped with a fixing apparatus for fixing a toner image on a recording material by applying heat and pressure to the recording material on which the toner image is formed. The fixing apparatus includes a rotating endless fixing belt, a fixing pad arranged non-rotatably on an inner circumference side of the fixing belt, and a pressure roller abutting against an outer circumference surface of the fixing belt. In the fixing apparatus, the fixing belt is pressed by the fixing pad and the pressure roller, by which a fixing nip portion is formed between the fixing belt and the pressure roller, and heat and pressure is applied to the recording material passing through the fixing nip portion, by which the toner image is fixed to the recording material.

If frictional force between the fixing belt and the fixing pad is great, rotation of the fixing belt is obstructed. Thus, an apparatus including a slide member that slides against a fixing belt to reduce the frictional force between the fixing belt and the fixing pad at the fixing nip portion where the pressure is high is proposed (Japanese Patent Application Laid-Open Publication No. 2017-181948). Recently, a slide member having a plurality of projected portions formed on a surface thereof is used to reduce the frictional force between the fixing belt and the slide member.

The fixing pad is provided with a fitting portion having a recessed shape, hereinafter referred to as a groove portion, in which the slide member is fit so that the slide member is retained on the fixing pad. Hitherto, the recording material could not be easily separated from the fixing belt due to the projected portions formed on the slide member, such that fixing failures on the recording material may occur.

In view of the problems mentioned above, the present technique aims at providing a fixing apparatus related to a configuration of fitting a slide member to a groove portion of a fixing pad and retaining the same therein, capable of suppressing occurrence of fixing failures on the recording material caused by the recording material not being separated from a fixing belt due to projected portions formed on the slide member.

SUMMARY OF THE INVENTION

According to a first aspect of the present invention, a fixing apparatus includes a belt having an endless shape and configured to apply heat to a recording material, a rotary member configured to abut against an outer circumference surface of the belt in a pressing direction, a pad member configured to form a nip portion by nipping the belt with the rotary member at an inner side of the belt, the rotary member being configured to nip and convey a recording material in a conveyance direction with the belt at the nip portion while applying heat and pressure to a toner image on the recording material to fix the toner image, and a slide member retained by the pad member and configured to slide against an inner circumference surface of the belt at the nip portion. The slide member includes a plurality of projections that protrude toward the rotary member on a side that slides against the belt and slide against the inner circumference surface of the belt. The pad member includes a guide portion that guides the belt after passing through the nip portion. In a state where the nip portion is formed, a distance in the conveyance direction between a first position and a second position is 3.0 mm or less, the first position being a downstream edge of a tip of a projection positioned most downstream in a direction of rotation of the belt among the plurality of projections, the second position being an upstream edge, in the direction of rotation of the belt, of the guide portion that comes into contact with the inner circumference surface of the belt. A distance in the pressing direction between a third position and a fourth position is 0.4 mm or more and 2.0 mm or less, the third position being the tip of the projection positioned most downstream in the direction of rotation of the belt among the plurality of projections, the fourth position being the upstream edge, in the direction of rotation of the belt, of the guide portion that comes into contact with the inner circumference surface of the belt.

Further features of the present invention will become apparent from the following description of exemplary embodiments with reference to the attached drawings.

DESCRIPTION OF THE EMBODIMENTS

A fixing apparatus according to a present embodiment will be described. At first, a general configuration of an image forming apparatus that is preferable for adopting the fixing apparatus according to the present embodiment will be described with reference to FIG. 1.

Image Forming Apparatus

An image forming apparatus 1 is a full-color printer adopting an electrophotographic system that includes four image forming units Pa, Pb, Pc, and Pd disposed to correspond to four colors, which are yellow, magenta, cyan, and black. The present embodiment is a tandem-type image forming apparatus 1 in which the image forming units Pa, Pb, Pc, and Pd are arranged along a direction of rotation of an intermediate transfer belt 204 described below. The image forming apparatus 1 forms a toner image on a recording material according to an image signal from a document reading apparatus 2 connected to an apparatus body 3 of the image forming apparatus 1 or a host apparatus such as a personal computer connected in a communicatable manner to the apparatus body 3. Examples of the recording material include paper, plastic films, cloths and other sheet materials.

Figure 1:
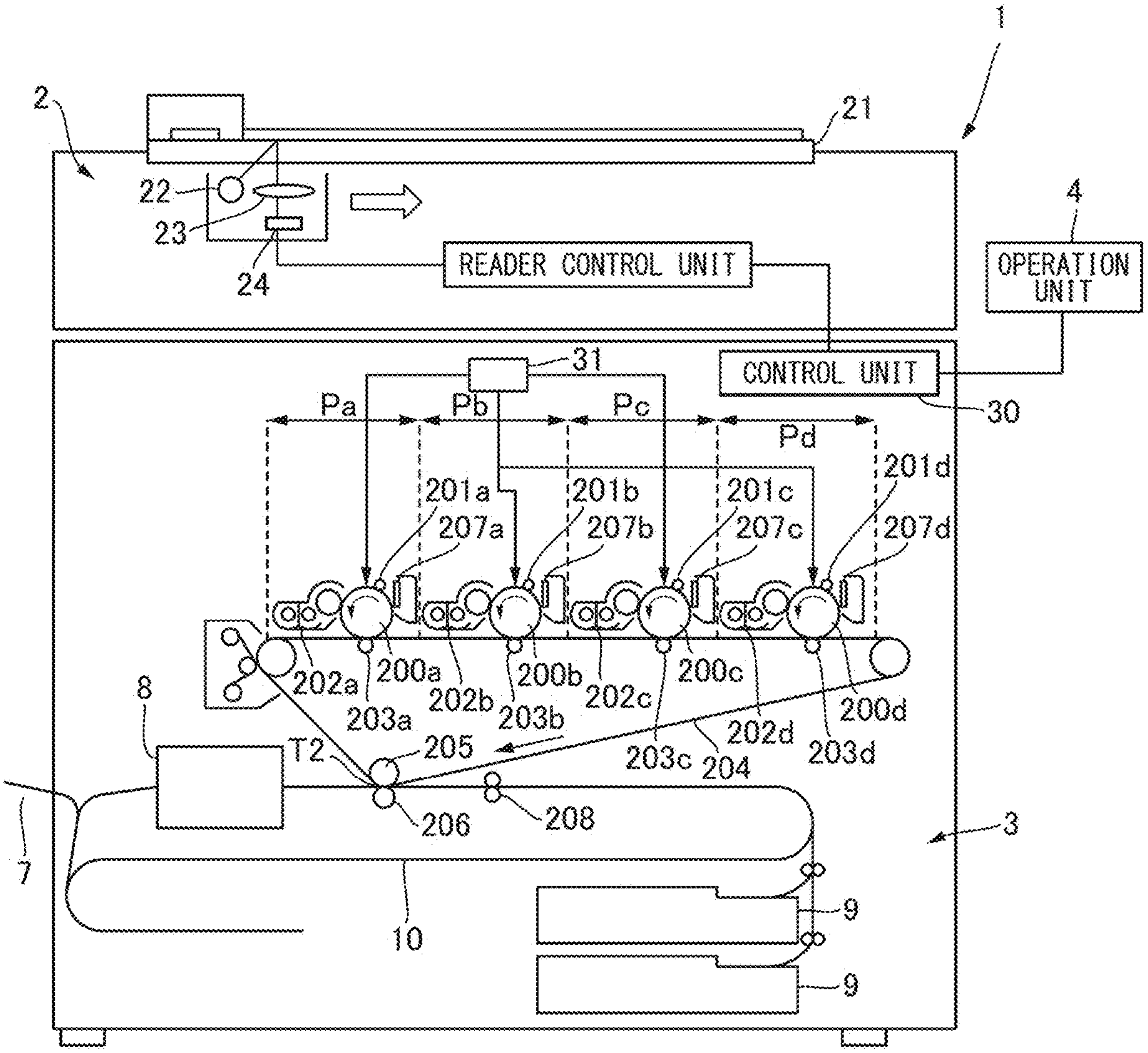
FIG. 1 is a schematic drawing illustrating an image forming apparatus that preferably adopts a fixing apparatus according to a present embodiment.

As illustrated in FIG. 1, the image forming apparatus 1 includes the document reading apparatus 2 and the apparatus body 3. The document reading apparatus 2 is an apparatus for reading a document placed on a platen glass 21, wherein light irradiated from a light source 22 is reflected on the document and an image is formed on a CCD sensor 24 through an optical member 23 such as a lens. When scanning is performed in the direction of an arrow under the control of a reader control unit, the optical unit reads the document per line and converts the same into an electric signal data string. The image signal obtained by the CCD sensor 24 is sent to the apparatus body 3, and image processing corresponding to the respective image forming units described below is performed in a control unit 30. Further, the control unit 30 receives external input as image signals from an external host apparatus such as a print server.

The apparatus body 3 is equipped with a plurality of image forming units Pa, Pb, Pc, and Pd, and image is formed in each image forming unit based on the above-mentioned image signals. That is, the image signals are converted into laser beams that have been subjected to pulse width modulation control (PWM) by the control unit 30. A polygon scanner 31 serving as an exposing unit scans laser beams corresponding to image signals. Then, laser beams are irradiated to photosensitive drums 200*a* to 200*d* serving as image bearing members of the respective image forming units Pa to Pd.

The image forming units form toner images of corresponding colors, wherein the image forming unit Pa forms a yellow (Y) toner image, the image forming unit Pb forms a magenta (M) toner image, the image forming unit Pc forms a cyan (C) toner image, and an image forming unit Pd forms a black (Bk) toner image. These image forming units Pa to Pd adopt an approximately identical configuration, such that the following description will describe the image forming unit Pa for forming a yellow (Y) toner image, and the descriptions on the other image forming unit Pb to Pd are omitted. In the image forming unit Pa, a toner image is formed on the surface of the photosensitive drum 200*a* based on image signals.

A charging roller 201*a* serving as a primary charger charges a surface of the photosensitive drum 200*a* to predetermined potential and prepares for the formation of an electrostatic latent image. The electrostatic latent image is formed on the surface of the photosensitive drum 200*a* charged to predetermined potential by laser beams from the polygon scanner 31. A developing unit 202*a* develops the electrostatic latent image on the photosensitive drum 200*a* and forms a toner image. A primary transfer roller 203*a* performs discharge from a rear side of the intermediate transfer belt 204, applies a primary transfer bias of opposite polarity as toner, and transfers the toner image on the photosensitive drum 200*a* to the intermediate transfer belt 204. The surface of the photosensitive drum 200*a* after transfer is cleaned by a cleaner 207*a*.

Further, the toner image on the intermediate transfer belt 204 is conveyed to the subsequent image forming units, where toner images of respective colors formed in each of the image forming units are sequentially transferred in the order of Y, M, C, and Bk, such that a four-color image is formed on the surface thereof. The toner image having passed through the image forming unit Pd of Bk which is positioned most downstream in a direction of rotation of the intermediate transfer belt 204 is conveyed to a secondary transfer portion T2 composed of a secondary transfer roller pair 205, 206. Thereafter, by having a secondary transfer electric field having opposite polarity as the toner image on the intermediate transfer belt 204 is applied at the secondary transfer portion T2, by which a toner image is secondarily transferred from the intermediate transfer belt 204 to the recording material.

The recording material is stored in a cassette 9, and the recording material fed from the cassette 9 is conveyed to a registration portion 208 composed of a pair of registration rollers, for example, where it stands by at the registration portion 208. Thereafter, the timing at the registration portion 208 is controlled such that the toner image on the intermediate transfer belt 204 corresponds to the paper position, and the recording material is conveyed to the secondary transfer portion T2.

The recording material having the toner image transferred thereto at the secondary transfer portion T2 is conveyed to a fixing apparatus 8, and heat and pressure is applied at the fixing apparatus 8, by which the toner image borne on the recording material is fixed to the recording material. The recording material having passed through the fixing apparatus 8 is discharged onto a sheet discharge tray 7. When forming images on both sides of the recording material, after completing transferring and fixing of a toner image to a first surface, i.e., front surface, the surface of the recording material is reversed via a reverse conveyance portion 10, and transferring and fixing of a toner image to a second surface, i.e., rear surface, of the recording material is performed before the recording material is stacked on the sheet discharge tray 7.

The control unit 30 performs control of the entire image forming apparatus 1, as described above. Further, the control unit 30 is capable of performing various settings based on an input from an operation unit 4 included in the image forming apparatus 1. The control unit 30 includes a Central Processing Unit (CPU), a Read Only Memory (ROM), and a Random Access Memory (RAM). The CPU performs control of various units by reading programs corresponding to the control procedures stored in the ROM. The RAM stores work data and input data, and the CPU refers to the data stored in the RAM based on the programs described above and performs control.

Fixing Apparatus

Figure 2B:
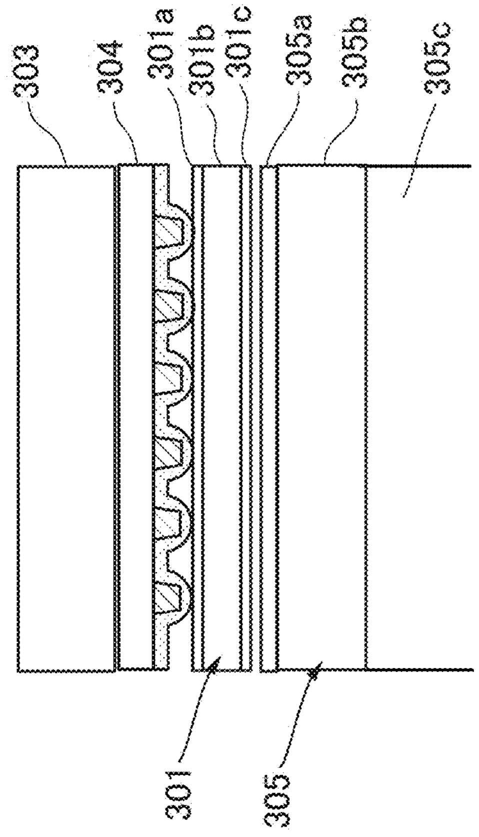
FIG. 2B is a cross-sectional view illustrating a fixing belt, a pressure roller, and a fixing pad unit.
Figure 2A:
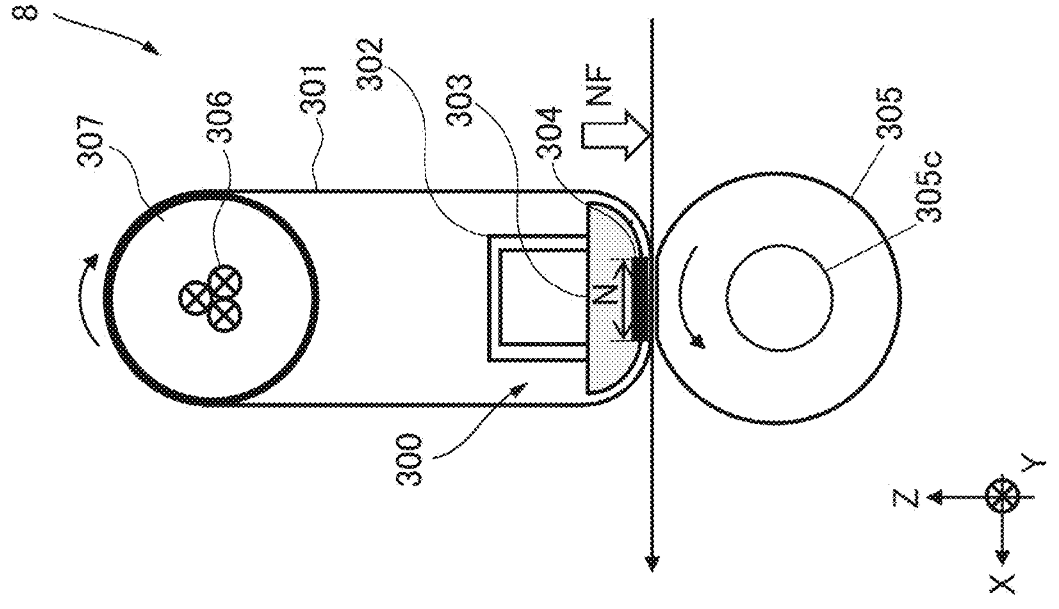
FIG. 2A is a schematic drawing illustrating the fixing apparatus.

Next, the configuration of the fixing apparatus 8 according to the present embodiment will be described with reference to FIGS. 2A to 4. In the present embodiment, a belt heating-type fixing apparatus utilizing an endless belt is adopted. As illustrated in FIG. 2A, in the fixing apparatus 8, the recording material is conveyed from right to left, i.e., arrow X direction. In the present specification, a width direction, i.e., longitudinal direction, refers to a direction intersecting a conveyance direction of the recording material in a fixing nip portion N, i.e., short direction, that is, refers to a rotational axis direction of a pressure roller 305.

The fixing apparatus 8 includes a fixing belt 301 that is endless and rotatable, the pressure roller 305 that abuts against the fixing belt 301 and that serves as an opposing member that forms the fixing nip portion N together with the fixing belt 301, a heating roller 307, and a fixing pad unit 300.

Fixing Belt

The fixing belt 301 is arranged in a replaceable manner in the fixing pad unit 300. The fixing belt 301 has thermal conductivity and heat-resisting property, and it is formed in a thin cylindrical shape. In the present embodiment, the fixing belt 301 adopts a three-layer structure in which a base layer 301*a* is disposed on an inner circumference side, an elastic layer 301*b* is arranged on an outer circumference of the base layer 301*a*, and a release layer 301*c* is formed on an outer circumference thereof, as illustrated in FIG. 2B. As an example, the base layer 301*a* has a thickness of "80 μm" and is formed of polyimide resin (PI), the elastic layer 301*b* has a thickness of "300 μm" and is formed of silicone rubber, and the release layer 301*c* has a thickness of "30 μm" and is formed of tetrafluoro-ethylene-perfluoro alkoxy ethylene copolymer resin (PFA). The outer diameter of the fixing belt 301 is set to "150 mm", for example. The fixing belt 301 configured as described above is arranged in a stretched manner by the heating roller 307 and the fixing pad unit 300. The fixing belt 301 is an example of a belt having an endless shape and configured to apply heat to a recording material.

Pressure Roller

The pressure roller 305 is supported rotatably on a fixing frame (not shown) of the fixing apparatus 8, wherein a gear (not shown) is fixed to one end portion thereof in a width direction, and the pressure roller 305 is driven to rotate by being connected via the gear to a drive source such as a motor (not shown). In a state where the pressure roller 305 is rotated, rotational force of the pressure roller 305 is transmitted to the fixing belt 301 by frictional force generated at the fixing nip portion N. Thereby, the fixing belt 301 is rotated following the rotation of the pressure roller 305. That is, the pressure roller 305 is an example of a rotary member configured to abut against an outer circumference surface of the fixing belt 301 in a pressing direction.

The pressure roller 305 has an elastic layer 305*b* formed on an outer circumference of a rotation shaft 305*c*, and a release layer 305*a* is formed on an outer circumference of the elastic layer 305*b*, as illustrated in FIG. 2B. As an example, the rotation shaft 305*c* is formed of a stainless steel (SUS) having a diameter of "72 mm", the elastic layer 305*b* is formed of a conductive silicone rubber having a thickness of "8 mm", and the release layer 305*a* is formed of a PFA having a thickness of "100 μm".

As illustrated in FIG. 2A, the pressure roller 305 abuts against an outer circumference surface of the fixing belt 301 so as to nip the fixing belt 301 with a slide member 304 described below, and forms the fixing nip portion N for nipping and conveying the recording material in a conveyance direction, i.e., arrow X direction, where the toner image is fixed to the recording material. Therefore, the pressure roller 305 is pressed toward the fixing pad unit 300 via the fixing belt 301 by a driving source not shown. In the present embodiment, for example, the pressure roller 305 abuts against the fixing belt 301 so that a pressure obtained at the fixing nip portion N (NF) is "1600 N", a conveyance direction length of the fixing nip portion N is "24.5 mm", and a width direction length thereof is "326 mm". In the present embodiment, the pressing direction in which the pressure roller 305 presses the fixing belt 301 is referred to as a Z direction. The pressing direction is a direction intersecting the conveyance direction, i.e., X direction, and the width direction, i.e., Y direction, and according to the present embodiment, it is a direction orthogonal thereto. The pressing direction is a direction in which the fixing belt 301 and the pressure roller 305 mutually press each other, and it includes both a case in which the pressure roller 305 presses the fixing belt 301 and a case in which the fixing belt 301 presses the pressure roller 305.

Heating Roller

The heating roller 307 is arranged on an inner circumference side of the fixing belt 301, and stretches the fixing belt 301 together with the fixing pad unit 300. The heating roller 307 is formed in a cylindrical shape of metal such as aluminum and stainless steel, and a halogen heater 306 serving as a heat source for heating the fixing belt 301 is arranged in the inner side thereof. The heating roller 307 is heated to a predetermined temperature by the halogen heater 306.

In the present embodiment, the heating roller 307 is formed of an aluminum pipe having a thickness of "1 mm", for example, from the viewpoint of thermal conductivity, and a surface layer thereof is subjected to anodizing treatment. The number of the halogen heater 306 can be one, but from the viewpoint of facilitating temperature distribution control of the heating roller 307 in the rotational axis direction, i.e., width direction, a plurality of halogen heaters 306 are desirably provided. The plurality of halogen heaters 306 have mutually varying light distributions in the width direction, and according to the size of the recording material, a lighting ratio is controlled by the control unit 30 (refer to FIG. 1). In the present embodiment, three halogen heaters 306 are arranged. The heat source is not limited to halogen heaters, and other heaters such as carbon heaters that can heat the heating roller 307 can be used.

The heating roller 307 can have a pivot axis arranged either on one end or near a center of the rotational axis direction, i.e., width direction, and that swings so as to generate a tension difference between one side and the other side of the fixing belt 301 in the width direction to thereby move the fixing belt 301 in the width direction. That is, the fixing belt 301 may be skewed to one side of the end portions in the width direction, which is so-called belt skew, during rotation, due to a diametral accuracy of the heating roller 307 stretching the belt or an alignment accuracy with a fixing pad 303 described later. Therefore, by swinging the heating roller 307, the position of the fixing belt 301 in the rotational axis direction, i.e., skew position, is controlled. Further, the heating roller 307 is urged by a spring supported on a frame (not shown) of the fixing apparatus 8, and it can also serve as a tension roller for applying a predetermined tension to the fixing belt 301.

Fixing Pad Unit

Next, the fixing pad unit 300 will be described. As illustrated in FIG. 2A, the fixing pad unit 300 includes a fixing stay 302, the fixing pad 303, and the slide member 304, which are arranged on an inner circumference side of the fixing belt 301. The fixing stay 302 is a rigid member made of metal, for example, that extends in the width direction along the fixing belt 301, and the fixing stay 302 supports the fixing pad 303 from the side of the pressure roller 305.

In the present embodiment, the fixing belt 301 is pressed toward the pressure roller 305 from the inner circumference side by the fixing pad 303 supported on the fixing stay 302. Thereby, the fixing nip portion N having a wide nip with sufficient conveyance direction length and width direction length is formed between the pressure roller 305 and the fixing belt 301. Further, by having the fixing pad 303 made of resin supported by the fixing stay 302 made of metal having a greater rigidity, deflection of the fixing pad 303 caused by the pressure received during pressing operation is reduced, such that a uniform fixing nip width in the width direction can be obtained.

Fixing Pad

The fixing pad 303 serving as a retaining member is disposed non-rotatably on an inner circumference side of the fixing belt 301 and includes a groove portion 303*f* (refer to FIG. 4) capable of fitting the slide member 304 having a long length therein, and retains the slide member 304 in contact with the inner circumference surface of the fixing belt 301. The fixing pad 303 is a resin member that extends in the width direction, and the width direction length of the fixing pad 303 is longer than the width direction length of a maximum-sized recording material on which image can be formed. The fixing pad 303 is formed of resin having insulation and heat-resisting properties, such as a liquid crystal polymer resin (LCP). The fixing pad 303 is a molded product that is manufactured by injection-molding such resin material using a mold. The fixing pad 303 is an example of a pad member configured to form the fixing nip portion N by nipping the fixing belt 301 with the pressure roller 305 at an inner side of the fixing belt 301.

Figure 4:
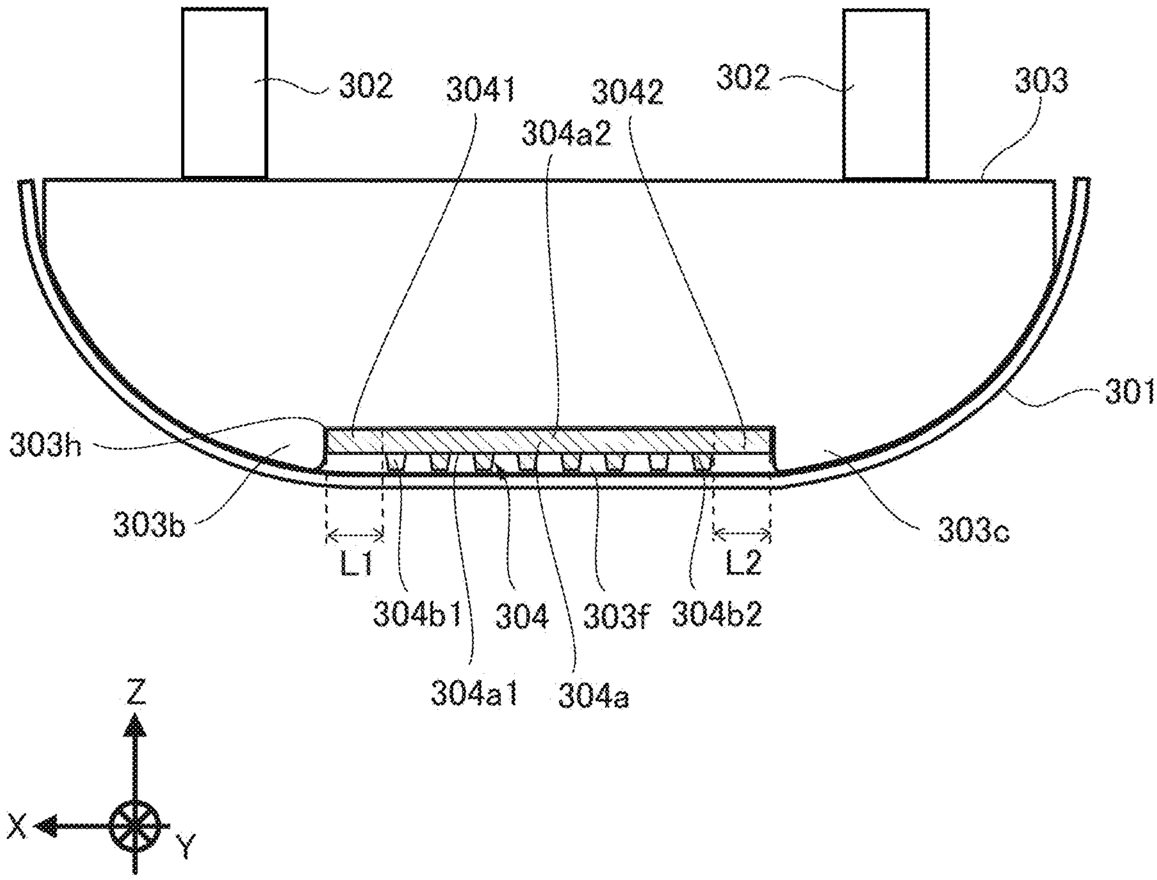
FIG. 4 is a cross-sectional view illustrating a vicinity of a fixing nip portion.

As illustrated in FIG. 4, the fixing pad 303 includes, with respect to the conveyance direction, an upstream-side guide portion 303*c* that abuts against the fixing belt 301 on an upstream side of a bottom surface 303*h* of the groove portion 303*f*, and a downstream-side guide portion 303*b* that abuts against the fixing belt 301 on a downstream side of the bottom surface 303*h*. The bottom surface 303*h* is a surface that contacts an opposite surface 304*a*2 opposite to a slide surface of the slide member 304, i.e., a tip of the projected portions. The upstream-side guide portion 303*c* guides the fixing belt 301 toward the fixing nip portion N, and the downstream-side guide portion 303*b* guides the fixing belt 301 that had passed through the fixing nip portion N toward the fixing stay 302 away from the fixing nip portion N. The upstream-side guide portion 303*c* and the downstream-side guide portion 303*b* abut against the fixing belt 301 across the entire area of a sheet passing area in the width direction through which a maximum-sized recording material on which image can be formed passes in the fixing nip portion N.

Slide Member

If frictional force between the fixing belt 301 and the fixing pad 303 is great, the rotation of the fixing belt 301 is obstructed. Therefore, according to the present embodiment, as illustrated in FIG. 2A, the fixing pad 303 is provided with the slide member 304 that slides against the fixing belt 301 so as to reduce the frictional force between the fixing belt 301 and the fixing pad 303 at the fixing nip portion N where pressure is high. The slide member 304 is arranged at a position opposing the pressure roller 305 interposing the fixing belt 301 in a state retained by the fixing pad 303. In the present embodiment, the slide member 304 is retained by the fixing pad 303 such that a short direction thereof corresponds to the conveyance direction. Also, the fixing pad 303 retains an entire area of the slide member 304 in the width direction intersecting the conveyance direction.

The slide member 304 has a heat-resisting property and strength, and is provided with a slide surface that abuts against the inner circumference surface of the fixing belt 301 being rotated and slides against the fixing belt 301 in a state retained by the fixing pad 303. By interposing the slide member 304 between the fixing pad 303 and the fixing belt 301, frictional force between the fixing pad 303 and the fixing belt 301 is reduced, such that the rotation of the fixing belt 301 is not obstructed by the fixing pad 303. A lubricant for smoothly sliding the fixing belt 301 against the slide member 304 can be applied on the inner circumference surface of the fixing belt 301. For example, a silicone oil can be used as the lubricant.

As described above, according to the present embodiment, frictional force between the fixing pad 303 and the fixing belt 301 is reduced by the slide member 304, and according to the present embodiment, the slide member 304 has a slide surface that slides against the fixing belt 301 formed in a concave-convex shape or an embossed shape, as illustrated in FIG. 2B.

The slide member 304 is formed of a metal material such as stainless steel (SUS), copper, or aluminum. In the case of the present embodiment, a stainless steel (SUS) having a thickness of "1 mm" is used to form the slide member 304. The slide member 304 is not limited to metal, and it can be formed using engineering plastics such as polyimide resin (PI), polyether ether ketone resin (PEEK), or LCP (liquid crystal polymer resin).

Figure 3A:
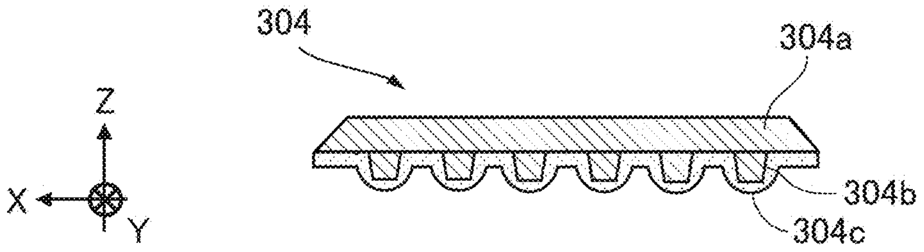
FIG. 3A is a schematic drawing illustrating a slide member.
Figure 3B:
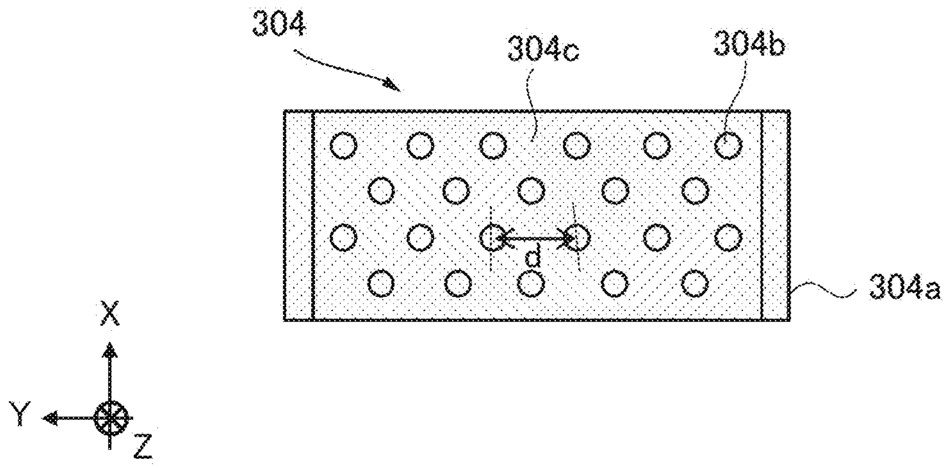
FIG. 3B is a top view illustrating the slide member.

As illustrated in FIGS. 3A and 3B, the slide member 304 includes a plate-shaped base 304*a*, and a plurality of projected portions 304*b* that protrude from the base 304*a* and slide against the fixing belt 301. As illustrated in FIG. 3A, the projected portions 304*b* protrude from a surface of the base 304*a*. The projected portions 304*b* have an amount of protrusion, that is, Z direction height, from the surface of the base 304*a* of "250 μm", for example. Further, as illustrated in FIG. 3B, the projected portions 304*b* are arranged on the base 304*a* such that distances between adjacent projected portions are approximately the same in the conveyance direction and distances between adjacent projected portions are approximately the same in the width direction. The distance, i.e., pitch, d between adjacent projected portions 304*b* is "1.4 mm", for example, in both the conveyance direction and the width direction. That is, the projected portions 304*b* are examples of a plurality of projections that protrude toward the pressure roller 305 on a side that slides against the fixing belt 301 and slide against the inner circumference surface of the fixing belt 301.

Further, a low friction layer 304*c* for reducing frictional force generated between the fixing belt 301 is provided on the surface of the slide member 304 using polytetrafluoroethylene resin (PTFE), or PFA, for example. In the present embodiment, a PTFE with a thickness of "20 μm" is coated on the surface of the base 304*a* and the projected portions 304*b*.

As illustrated in FIG. 4, in the present embodiment, the surface of the slide member 304 is formed in a concave-convex shape, and the slide member 304 slides against the fixing belt 301 at the tip surface of the projected portions 304*b*. Thereby, the contact area between the slide member 304 and the fixing belt 301 is reduced, and the frictional force generated between the fixing belt 301 is reduced. Further, since the low friction layer 304*c* is coated on the surface of the projected portions 304*b*, the frictional force generated between the fixing belt 301 is also reduced thereby.

As described above, the fixing pad 303 retains the slide member 304 such that the inner circumference surface of the fixing belt 301 slides against the tip surface of the projected portions 304*b*. In order to do so, the groove portion 303*f* having a recessed shape is formed on the fixing pad 303 for fitting and retaining the slide member 304 on the opposite side from the side being supported by the fixing stay 302.

According to the present embodiment, the slide member 304 has a first planar area 3041 and a second planar area 3042 on both end portions in the conveyance direction, i.e., short direction, in which projected portions 304*b* are not formed. The first planar area 3041 is a flat portion area from a downstream edge of the base 304*a* to a most downstream projected portion 304*b*1 that is formed most downstream among the plurality of projected portions 304*b* in the conveyance direction. The second planar area 3042 is a flat portion area from an upstream edge of the base 304*a* to a most upstream projected portion 304*b*2 that is formed most upstream among the plurality of projected portions 304*b* in the conveyance direction. In the present embodiment, in a state where the slide member 304 is retained by the fixing pad 303, the first planar area 3041 and the second planar area 3042 are in contact with the bottom surface 303*h* of the groove portion 303*f* of the fixing pad 303, similar to the base 304*a*.

Comparative Example

Figure 6:
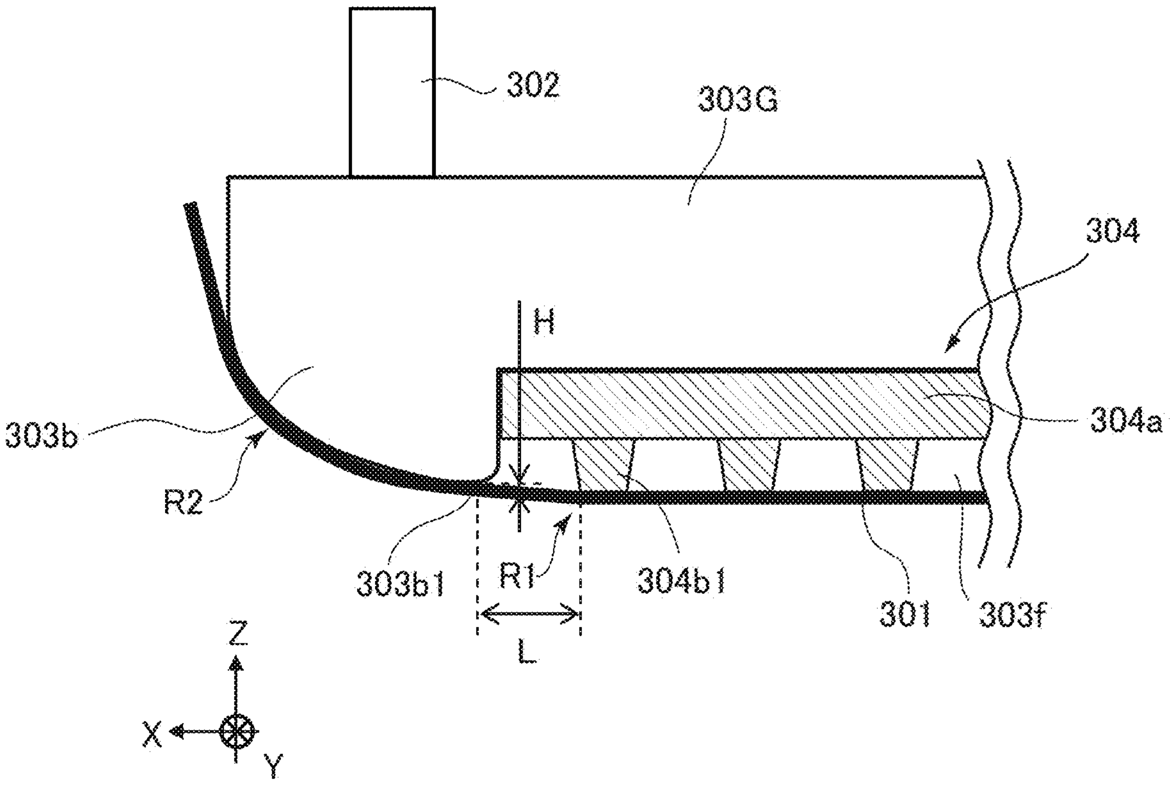
FIG. 6 is a cross-sectional view illustrating a vicinity of an outlet of a fixing nip portion according to a comparative example.

In the case of a configuration in which the slide member 304 is fit to and retained by the groove portion 303*f* of the fixing pad 303, the recording material is not easily separated appropriately from the fixing belt 301, and fixing failures of the recording material may be caused. This comparative configuration will be described based on FIG. 6 with reference to FIG. 2A. FIG. 6 is a cross-sectional view illustrating a vicinity of an outlet of the fixing nip portion N in the comparative example.

In the following description, in a state where the slide member 304 slides against the fixing belt 301, a difference between a tip of the most downstream projected portion 304*b*1 that is arranged most downstream in the conveyance direction, i.e., arrow X direction, among the projected portions 304*b* and a proximity position 303*b*1 that is closest to the fixing nip portion N in the downstream-side guide portion 303*b* regarding the direction of protrusion of the projected portions 304*b*, i.e., opposite direction as arrow Z, when viewed in the width direction, i.e., arrow Y direction, is denoted as height "H". Further, a distance between a downstream end of the tip of the most downstream projected portion 304*b*1 and the proximity position 303*b*1 regarding the conveyance direction is denoted as distance "L". A stretched state of the fixing belt 301 by the fixing pad 303 and the slide member 304 downstream of the fixing nip portion N is changed in accordance with the height "H" and the distance "L".

According to the stretched state of the fixing belt 301 in the case where the height "H" is smaller than a predetermined height and the distance "L" is greater than a predetermined distance, the fixing belt 301 that has passed through the fixing nip portion N cannot be raised sharply, and so it is difficult to ensure a separating function of the recording material from the fixing belt 301. For example, as illustrated in FIG. 6, if the height "H" is smaller than a predetermined height, a radius of curvature of a curved portion R1 becomes greater than a radius of curvature of a curved portion R2. According to this configuration, the force in which the fixing belt 301 is stretched at the curved portion R2 becomes stronger than the force in which the fixing belt 301 is stretched at the curved portion R1, such that the fixing belt 301 rotates along a trajectory in proximity to the recording material discharged from the fixing nip portion N.

If the fixing belt 301 forms a trajectory in proximity to the recording material, the force for separating the recording material having passed through the fixing nip portion N from the fixing belt 301 becomes small, such that the desired separating function cannot be obtained. Then, excessive heat is applied to the recording material from the fixing belt 301, such that fixing failures of toner image occurs by excessive heating. Further, the recording material having passed through the fixing nip portion N may be waved or deformed by having heat and pressure applied thereto. If the recording material having passed through the fixing nip portion N and the fixing belt 301 are in proximity, the recording material having passed through the fixing nip portion N will have some areas come into contact with the fixing belt 301 and other areas that do not, and fixing failures such as gloss unevenness occur.

Further, as illustrated in FIG. 6, even in a case where the distance "L" is greater than the predetermined distance, similar to the case described above where the height "H" is smaller than the predetermined height, the fixing belt 301 rotates along a trajectory in proximity to the recording material discharged from the fixing nip portion N. Further, if the distance "L" is greater than the predetermined distance, the fixing belt 301 tends to flutter. Therefore, even in a case where the distance "L" is greater than the predetermined distance, fixing failures described above may occur.

Figure 5:
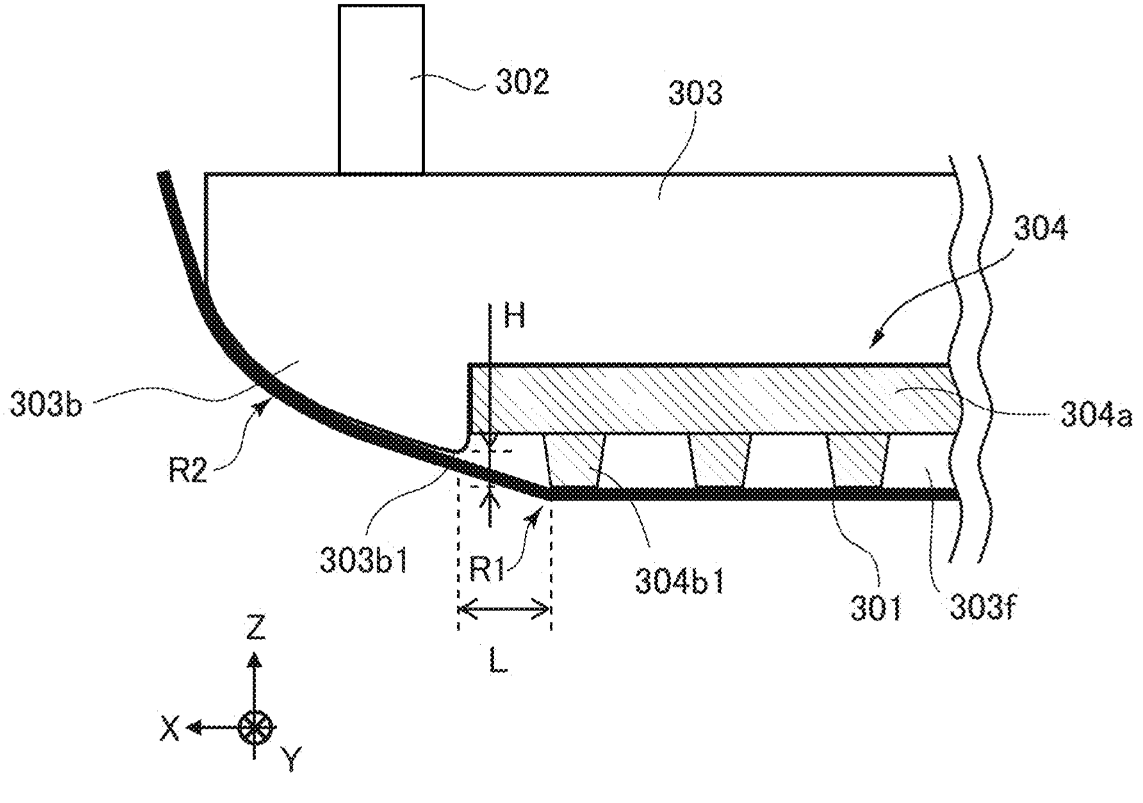
FIG. 5 is a cross-sectional view illustrating a vicinity of an outlet of the fixing nip portion according to the present embodiment.

Therefore, according to the present embodiment, the fixing belt 301 is caused to rotate along a trajectory that is raised sharply after passing through the fixing nip portion N such that the height "H" is equal to or greater than the predetermined height and the distance "L" is equal to or smaller than the predetermined distance to suppress the occurrence of fixing failures as described above. The configuration of such a present embodiment will be described below with reference to FIG. 5. FIG. 5 is a cross-sectional view illustrating a vicinity of an outlet of the fixing nip portion according to the present embodiment.

In the present embodiment, the height "H" is "0.4 mm or more and 2 mm or less", and the distance "L" is "3 mm or less". That is, in a state slid against the fixing belt 301, the tip of the most downstream projected portion 304*b*1 in the slide member 304 is protruded by "0.4 mm or more and 2 mm or less" from the proximity position 303*b*1 closest to the fixing nip portion N in the downstream-side guide portion 303*b* when viewed in the width direction. Further, the slide member 304 has the most downstream projected portion 304*b*1 formed on the base 304*a* such that the distance in the conveyance direction between the downstream edge of the tip of the most downstream projected portion 304*b*1 and the proximity position 303*b*1 (distance "L") is "3 mm or less". In that case, the downstream-side guide portion 303*b* is positioned such that the proximity position 303*b*1 is retreated in the arrow Z direction from the tip of the most downstream projected portion 304*b*1. That is, in a state where the fixing nip portion N is formed, the distance L is a distance in the conveyance direction between a first position and a second position. The first position is a downstream edge of a tip of the projected portion 304*b*1 positioned most downstream in a direction of rotation of the fixing belt 301 among the plurality of projected portions 304*b*. The second position is an upstream edge, in the direction of rotation of the fixing belt 301, of the downstream-side guide portion 303*b* that comes into contact with the inner circumference surface of the fixing belt 301. Also, the height H is a distance in the pressing direction between a third position and a fourth position. The third position is the tip of the projected portion 304*b*1 positioned most downstream in the direction of rotation of the fixing belt 301 among the plurality of projected portions 304*b*. The fourth position is the upstream edge, in the direction of rotation of the fixing belt 301, of the downstream-side guide portion 303*b* that comes into contact with the inner circumference surface of the fixing belt 301.

Thereby, in the present embodiment, as can be recognized in comparison to the comparative example illustrated in FIG. 6, the fixing belt 301 rotates along a trajectory that rises sharply after passing through the fixing nip portion N instead of along a trajectory in proximity to the recording material. Accordingly, it becomes possible to ensure the force for separating the recording material having passed through the fixing nip portion N from the fixing belt 301 and to acquire a desired separating function, such that the occurrence of fixing failures as described above can be suppressed. That is, it becomes possible to suppress the occurrence of fixing failures on the recording material caused by the projected portions formed on the slide member 304 without deteriorating the separability of the recording material having passed through the fixing belt 301.

In the present embodiment, a configuration is adopted in which the height "H" is "0.4 mm or more and 2 mm or less" and the distance "L" is "3 mm or less" across at least the entire sheet passing area of the fixing nip portion N in the width direction. Therefore, even in the case of a recording material of any size, the desired separating function can be obtained, and fixing failures can be suppressed.

Planar Area

If the height of the plurality of projected portions 304*b* on the slide member 304 is not uniform, unevenness of pressure may be generated in the fixing nip portion N and fixing failures may be caused in the recording material. The height difference of the projected portions 304*b* that causes fixing failures is, for example, approximately 20 to 50 μm. In order to prevent fixing failures of the recording material caused by the height of the projected portions 304*b*, for example, a contactless inspection apparatus by laser scanning is used to measure the heights of the plurality of projected portions 304*b* and perform inspection of the slide member 304. The contactless inspection apparatus measures the heights of the projected portions 304*b* by a line scanning sensor, called a scan sensor, using laser light, and compares the measured values with a reference value that is provided in a projected portion shape profile prepared in advance. Then, if the difference between the measured values and the reference value is within a predetermined range, such as 15 μm or less, it is determined that the slide member 304 is a good product. The slide member 304 that is not determined as a good product will not be used.

When being formed of a base material such as stainless steel, the slide member 304 may be warped from a center portion in the width direction, i.e., longitudinal direction, due to the accuracy of the base material or the residual stress during processing of the base material. The difference in height between the end portions and the center portion in the width direction caused by warping is approximately "2 mm", for example, though it may vary among the individual slide members 304. If the slide member 304 is warped, it is difficult to measure the height of the projected portions 304*b* using the contactless inspection apparatus with high accuracy, such that it is necessary to measure the heigh of the projected portions 304*b* after straightening the warping of the slide member 304. In order to straighten the warping of the slide member 304, the slide member 304 is nipped between and fixed, i.e., clamped, by the surface plate and clamp members, as described below. If the thickness of the base 304*a* is "1.0 mm", for example, a clamping force by clamp members (not shown) that is required to straighten the warping of the slide member 304 is set to approximately "2 to 4 N".

In the present embodiment, the first planar area 3041 and the second planar area 3042 are clamped, such that the height of the projected portions 304*b* is measured in a state where the warping of the slide member 304 is straightened (refer to FIG. 4). The first planar area 3041 and the second planar area 3042 are formed to have a length (L1, L2) capable of being clamped without interfering with the projected portions 304*b* in the conveyance direction. For example, the first planar area 3041 is formed to have a length "L1" that is "0.5 mm" or more from a first end portion positioned most downstream of the base 304*a* in the short direction, i.e., conveyance direction. Similarly, the second planar area 3042 is formed to a have a length "L2" that is "0.5 mm" or more from a second end portion positioned most upstream of the base 304*a* in the short direction, i.e., conveyance direction. Thereby the height of the projected portions 304*b* can be measured with high accuracy in a state where the warping of the slide member 304 is straightened.

In order to clamp the slide member 304 reliably and straighten the warping thereof, the conveyance direction length of the first planar area 3041 and the second planar area 3042 is preferably "1.0 mm" or more. Further, the first planar area 3041 and the second planar area 3042 are preferably formed across the entire area in the width direction, i.e., entire area in the longitudinal direction, of the slide member 304. In the present embodiment, the first planar area 3041 and the second planar area 3042 are formed across an entire area of the slide member 304 in the width direction intersecting the conveyance direction.

In the case of the slide member 304 of the present embodiment, as illustrated in FIG. 4, the first planar area 3041 and the second planar area 3042 are formed out of the range of the fixing nip portion N so as not to contact the fixing belt 301. Therefore, even if minute scratches or recesses are formed to the first planar area 3041 and the second planar area 3042 by the pressing of the clamp members, the fixing of toner image on the recording material is not affected in any way.

As described above, from the viewpoint of clamping the slide member 304 infallibly, the conveyance direction length of the first planar area 3041 and the second planar area 3042 (L1, L2) is "0.5 mm" or more, preferably "1.0 mm" or more. However, if the conveyance direction length of the first planar area 3041 and the second planar area 3042 (L1, L2) is longer than necessary, the conveyance direction length of the fixing nip portion N (refer to FIG. 2A) will be short and unevenness of pressure tends to occur. To cope with this situation, the length of the slide member 304 itself can be extended to ensure the conveyance direction length of the fixing nip portion N, but such measures are not taken since costs are increased and the size of the fixing apparatus 8 is also increased. Moreover, depending on the conveyance length of the first planar area 3041 and the second planar area 3042 (L1, L2), the distance from the most downstream edge of the fixing nip portion N to a most upstream edge of a separation plate (not shown) is increased. The separation plate is arranged on a downstream side of the fixing apparatus 8 to separate the recording material having passed through the fixing nip portion N from the fixing belt 301. The above-mentioned configuration is not preferable since it becomes difficult to separate the recording material from the fixing belt 301.

In view of the above-mentioned points, the conveyance direction length of the first planar area 3041 and the second planar area 3042 is set to "2.0 mm" or less. In conclusion, the conveyance direction length (L1, L2) of the first planar area 3041 and the second planar area 3042 is "0.5 mm or more and 2.0 mm or less", preferably "1.0 mm or more and 1.5 mm or less". The conveyance direction length (L1) of the first planar area 3041 is smaller than the above-mentioned distance "L" (L1<L). The first planar area 3041 and the second planar area 3042 are examples of planar areas at each of both end portions in the short direction in a range of 0.5 mm or more and 2.0 mm or less in the short direction from each of both edges of the slide member 304. Also, the first planar area 3041 and the second planar area 3042 are areas where the plurality of projected portions 304*b* are not formed and the slide member 304 is not in contact with the fixing belt 301.

Other Embodiments

The embodiments described above is not limited to the configuration of heating the fixing belt 301, and the present technique is applicable to a configuration in which a pressing belt in the shape of a belt is used instead of the pressure roller 305, wherein the pressing belt is heated by a heater. In that case, a direction in which the pressing belt presses the opposing roller is referred to as the pressing direction.

According to the present technique, a configuration of fitting and retaining a slide member in a groove portion of a retaining member can be realized by a simple configuration while suppressing the occurrence of fixing failures of the recording material caused by the recording material not being separated desirably from the fixing belt due to projected portions formed on the slide member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028927, filed Feb. 28, 2022 which is hereby incorporated by reference herein in its entirety.

What is claimed is:

1. A fixing apparatus comprising:

a belt having an endless shape and configured to apply heat to a recording material;

a pressure rotary member configured to abut against an outer circumference surface of the belt;

a heating rotary member disposed at a position different from a nip portion on an inner circumference surface of the belt, the heating rotary member being configured to stretch the belt and heat the belt;

a pad member configured to form a nip portion by nipping the belt with the pressure rotary member at an inner side of the belt, the pressure rotary member being configured to nip and convey the recording material with the belt at the nip portion while applying heat and pressure to a toner image on the recording material to fix the toner image; and a slide member retained by the pad member and configured to slide against an inner circumference surface of the belt at the nip portion, wherein the slide member includes a plurality of projections that protrude toward the pressure rotary member on a side that slides against the belt, wherein the pad member is configured to slide against the inner circumference surface of the belt at a position at least downstream from the nip portion in a conveyance direction of the recording material, wherein the pad member includes a guide member configured to guide the belt after the belt passes through the nip portion, and wherein, in a state in which the nip portion is formed, an upstream end of the guide member that contacts the inner circumference surface of the belt in a rotation direction of the belt is positioned, in a direction toward the pressure rotary member, between a downstream end of a base of the slide member on a side that slides against the belt in the rotation direction of the belt and a tip of a projection that is located most downstream among the plurality of projections in the rotation direction of the belt.

2. The fixing apparatus according to claim 1, wherein the pad member is configured to slide against the inner circumference surface of the belt at a position upstream from the nip portion in the conveyance direction.

3. The fixing apparatus according to claim 1, wherein the pad member retains an entire area of the slide member in a width direction intersecting the conveyance direction.

4. The fixing apparatus according to claim 1, wherein the slide member includes a low friction layer that reduces frictional force between the plurality of projections and the belt.

5. The fixing apparatus according to claim 1, wherein the slide member includes a base on which the plurality of projections are provided.

6. The fixing apparatus according to claim 5, wherein the pad member is formed of resin, and wherein the base of the slide member is formed of metal.

7. The fixing apparatus according to claim 6, wherein the slide member includes a low friction layer on a surface of the base that reduces frictional force between the plurality of projections and the belt.

8. The fixing apparatus according to claim 1, wherein the plurality of projections are formed over an entire area of the nip portion.

* * * * *